Sept. 9, 1952 R. A. BRATTON 2,610,062

INDEXING SYSTEM

Filed Sept. 7, 1949 2 SHEETS—SHEET 1

INVENTOR.
ROBERT A. BRATTON
BY

Schmieding, Hitson and Gerber
Attorneys

Sept. 9, 1952 R. A. BRATTON 2,610,062
INDEXING SYSTEM
Filed Sept. 7, 1949 2 SHEETS—SHEET 2

INVENTOR.
ROBERT A. BRATTON
BY
Schmieding, Hittson and Gerber
Attorneys

Patented Sept. 9, 1952

2,610,062

UNITED STATES PATENT OFFICE 2,610,062

INDEXING SYSTEM

Robert A. Bratton, Columbus, Ohio, assignor, by mesne assignments, to The Brush Development Company, Cleveland, Ohio, a corporation of Ohio Application September 7, 1949, Serial No. 114,371

1 Claim. (Cl. 274—1)

This invention relates to an indexing means for use in machines capable of recording or reproducing oral dictation. In general, the invention is embodied in a dictating machine having a recording element, a turntable for the recording element, a motor for driving the turntable, an element responsive to the dictation which is adapted to ride upon the surface of the recording element, means for moving this element relative to the recording element, an index means for determining the width of the surface area upon which recording has been effected, and a marker for automatically indicating such data on the surface of the recording element.

One of the objects of this invention is to provide a recording element or blank having indicia appearing directly upon the surface of the recording element and extending across substantially the entire width of the surface available for recording. The indicia so provided is adapted to be marked to indicate on the surface of the recording element the extent and location of that portion of the recording surface upon which recording has been effected. This indicia forms an index adapted to receive markings conveying instructions and directions concerning the material recorded, which becomes a visible and integral part of the recording element, and which is always available for use in recording or reproducing dictation. One of the features of this construction is that the dictation can be transcribed, or the recording element with dictation recorded thereon filed for future use without requiring separate instructions to be written out concerning the dictation and without danger of losing or misplacing such instructions.

Another object of this invention is to provide an index of the character described which can be used with other indexing means having similar indicia for determining at any time the amount of dictation recorded as well as the width of the recording surface still available for use. With these indexes, the operator is always advised of the particular area on the recording surface where any given dictation is recorded, which facilitates referring to or reproducing such dictation, and which also enables the operator to know at what point the last given dictation was completed.

It is also an object of the invention to provide a mechanism which operates automatically to place a visible mark on the surface of the recording element within the indexing area. The operator recording dictation is thus able to mark on the index data pertinent to reproducing or transcribing certain dictation from the recording element at a later period.

Further objects and advantages of the present invention will be apparent from the following description, reference being had to the accompanying drawings wherein a preferred form of embodiment of the invention is clearly shown.

Figure 1:
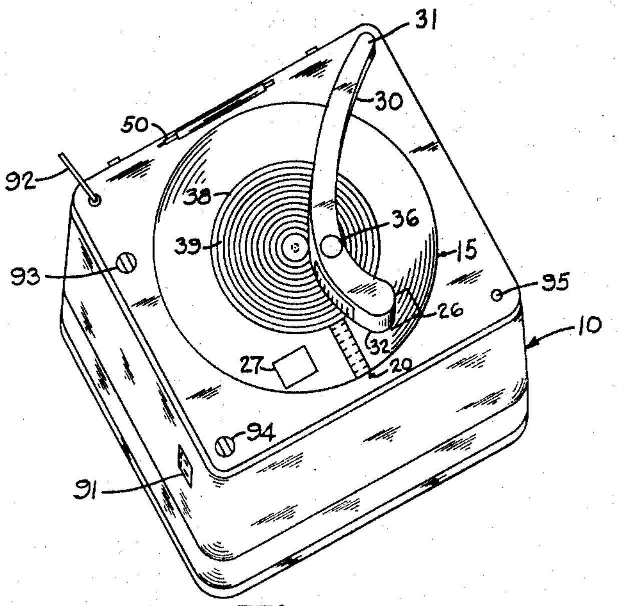
Fig. 1 is a perspective view of a machine for recording dictation and illustrating a recording element embodying an index in accordance with the present invention.

Referring further to the drawings, the machine illustrated in Fig. 1 comprises, in general, a housing or base 10. A turntable 11, Fig. 3, is rotatably supported on top of the base. The motor means for driving the turntable is contained within the base and not shown since it is of the usual type provided for such purposes. The pins 13 and 14, Fig. 2, projecting from the top of the turntable, provide for locating and retaining the recording element 15 on the turntable.

In the form shown, the recording medium or element 15 comprises a thin, circular disc or blank. This blank is provided with a surface upon which the dictation is recorded by electrical means. For example, this surface may have a metal coating of iron oxide suitable for magnetically recording the dictation. Circular openings extend through the blank 15. The pins 13 and 14 extend through these openings and provide for retaining the blank on the turntable.

Figure 2:
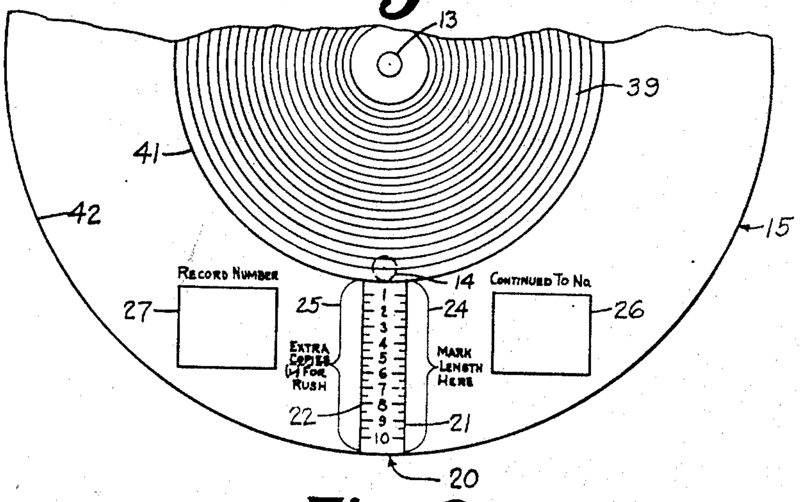
Fig. 2 is a broken, top elevational view on an enlarged scale of the recording element and grooved tracking disc shown in Fig. 1.
Figure 3:
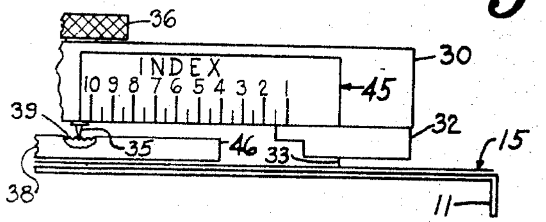
Fig. 3 is a broken, side elevational view through the recording arm and turntable of the machine shown in Fig. 1.

An index, generally indicated at 20, Fig. 2, is provided on the top surface of the blank 15. This index is printed, or otherwise marked in any suitable manner, directly upon the recording surface and extends across substantially the full width of the area available for recording dictation. As shown in Fig. 2, this index includes indicia in the form of a scale having an increasingly numbered sequence of equal increments 21 extending transversely to the direction in which the blank 15 is rotated. The indicia or marks 22 are identified by a series of numbers, here shown as being from 1 to 10, inclusive. There are intermediate marks between each of the main or numbered marks to facilitate reading and marking the index as hereafter described. The index 20 is also provided with bracketed areas on each side, as indicated at 24 and 25, bearing legends for instructing the operator in the use of the index. On each side of the bracketed areas, boxes, as indicated at 26 and 27, are provided and labeled to receive the identifying number of the record blank and the identifying number of the next record blank used if the dictation is continued from one blank to another.

An element 30, responsive to the dictation, is adapted to engage and ride upon the surface of the blank 15 as it rotates to record the dictation thereon. This element is in the form of a recording or pick-up arm having a swivel connection at the end 31 to the base 10. This connection provides for substantially free movement of the arm. The other end of the arm is provided with a recessed head 32, Fig. 3, having a transducer 33 adapted to ride directly upon the recording surface of the blank 15. A guide pin or stylus 35 extends through the arm 30 so as to project from the underside as shown. This pin is movably mounted in the arm 30 and eccentrically connected to a tuning device which includes a knurled screw 36. As the screw 36 is turned, it varies slightly the distance between the pin 35 and the transducer 33, thereby accurately locating the transducer 33 with respect to the record track on the record disc 15.

Means are provided for translatably moving the arm 30 relative to the blank 15 as the latter revolves on the turntable to effect the recording of the dictation. This means includes a flat disc 38 having a spiral groove 39 formed on the surface thereof. This disc is provided with circular openings on the underside thereof into which the pins 13 and 14 are inserted to locate and retain the disc on top of the blank 15. When the arm 30 is swung so that the stylus 35 engages in the groove 39 nearest the center of the disc 38, i. e., to the pin 13, the rotation of the turntable causes the arm 30 to move as the guide stylus 35 follows the groove 39. The transducer 33 rides on the recording surface of the blank 15 to effect the recording of the dictation. The arm 30 is moved so that the transducer 33 travels across the entire width of the surface provided on blank 15 to receive dictation, e. g., the surface area indicated between the lines 41 and 42 in Fig. 2.

An index, generally indicated at 45 in Fig. 3, is carried on the end of arm 30 as shown. This index has similar spacing of indicia and numbering to those provided for the index 20. The index 45 is positioned on the arm 30 so that when the arm is set with the guide stylus 35 closest to the center of disc 38, the indicia or mark number 1 is aligned directly over the outside edge 46, Fig. 3, of the disc 38. The edge 46 thus forms a reference point for reading the index 45. For example, referring to Fig. 3, it can be seen that the arm 30 has moved a distance equal to four units on the index. There is thus provided a measure visible to the operator indicating the amount of dictation recorded on the blank 15, as well as providing a visible indication of the amount of blank 15 still available to receive additional dictation. If the dictation, for example, a letter or report is completed at this point, this information is marked directly upon the surface of blank 15 by placing a check mark, or similar symbol, opposite the numeral four on the right-hand side of the index 20. A crayon 50 having a soft marking point is provided for this purpose. Also, if any additional instructions or information is essential for the transscription of the recorded dictation, it can be marked directly upon the recording surface of blank 15 in the areas indicated on the blank for that purpose. There is no danger of such information being lost or misplaced, as would be the case where separated sheets of paper were used to receive the instructions. Furthermore, such markings on the surface of the blank 15 do not interfere with the recording of dictation. The transducer 33 passes freely over the surface and is not affected in any way by the markings so placed on the blank 15.

Figure 5:
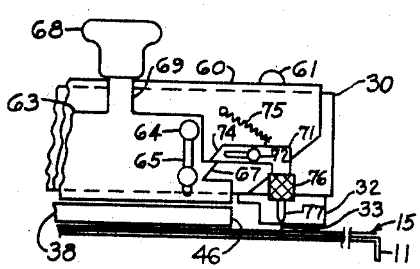
Fig. 5 is a fragmentary view, similar to Fig. 4, showing the marking mechanism set in the first operating position prior to engaging the surface of the recording element or disc.
Figure 6:
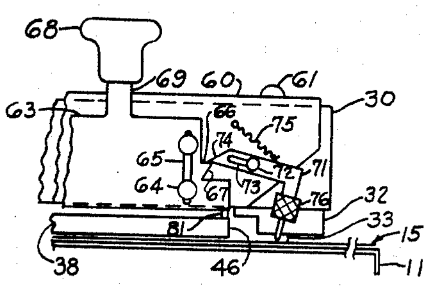
Fig. 6 is a view, similar to Fig. 5, showing the marking mechanism set in the second operating position with the crayon engaging the surface of the recording element.
Figures 7, 8, 9:
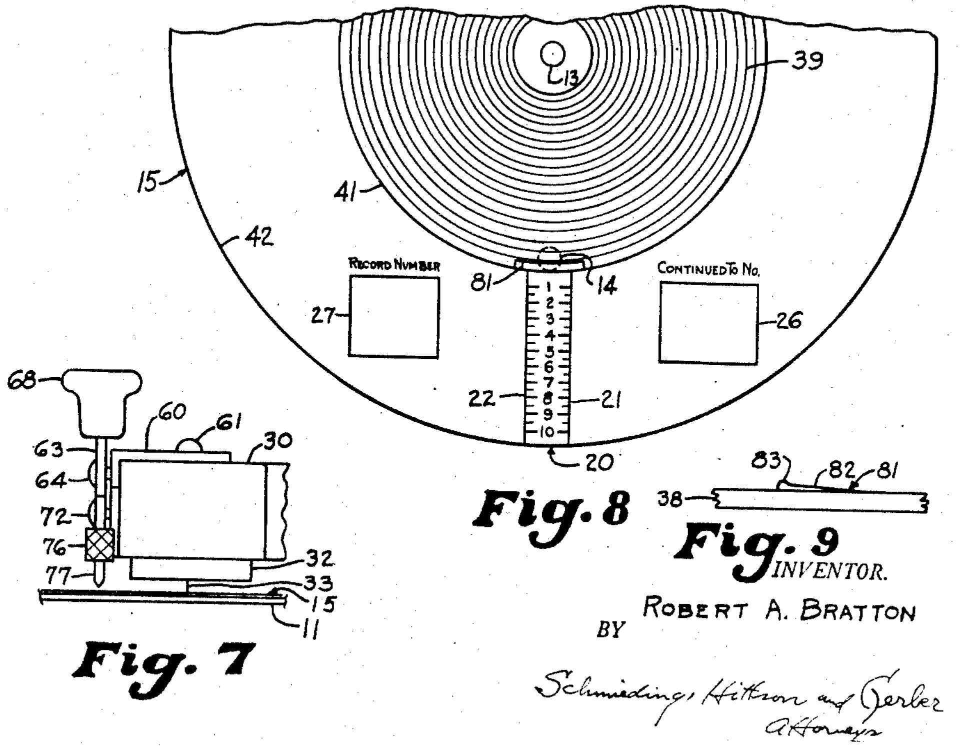
Fig. 7 is a partial, front elevational view showing the marking mechanism mounted on the end of the recording arm.
Fig. 8 is a view, similar to Fig. 2, showing the location of the cam element used to operate the marking mechanism.
Fig. 9 is a broken, side elevational view of the grooved tracking disc showing the cam element mounted thereon.

Means for automatically placing a visible mark on the blank 15 within the index area 20, as shown in Figs. 4 to 9, can be used if so desired. This marking mechanism replaces the index 45 and comprises a bracket 60 fastened to the outer end of the arm 30 with the same screw 61 used to mount the head 32 in position. This bracket extends along the side of the arm, as shown in Fig. 7, and forms a support for the finger operated member or plate 63. This plate is slidably mounted on the bracket with pins, as indicated at 64 in Fig. 4, extending through the slots 65 formed in the plate. At one end the plate 63 is provided with a shoulder 66 having a tapered surface 67 extending downwardly and inwardly from the shoulder. A button 68 for the operator's finger is carried on the plate extension 69 and provides for moving the plate downwardly from the position shown in Fig. 4 to that shown in Fig. 5.

Figure 4:
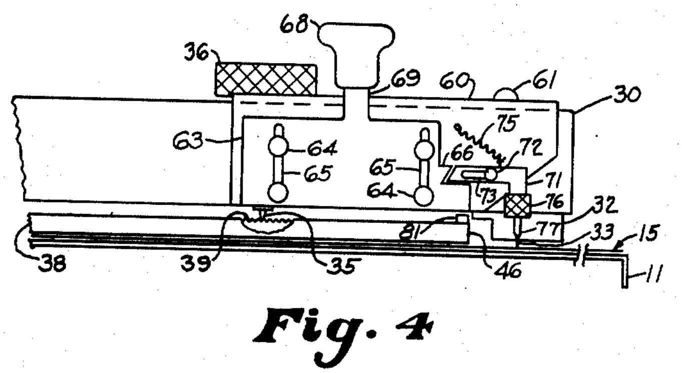
Fig. 4 is a broken, side elevational view of the recording arm and turntable and showing mechanism mounted on the arm for automatically placing a visible mark on the recording element or disc, the marking mechanism being shown in the normal or non-marking position.

The marking mechanism includes a marketing member or arm 71. This member is in the form of an arm pivotally mounted on the bracket 60, being carried on a pin 72 extending through the slot 73 formed in the arm. The arm is tapered at one end to provide a surface 74 which normally extends in parallel spaced relation with respect to the shoulder surface 67 on plate 63. A coil spring 75 has one end fastened to the arm 71 and the other end to the side of bracket 60 as shown in Fig. 4. This spring provides for moving the arm into the positions shown in Figs. 4 and 5. The outer end of arm 71, that is, the right end as viewed in Fig. 4, carries a crayon holder 76 in which a piece of crayon 77 suitable for marking on the surface of disc 15 is adjustably mounted. Thus, in operation, when the operator pushes down on the button 68, the slots 65 allow plate 63 to slide down from the position shown in Fig. 4 to that shown in Fig. 5. This movement of the plate causes the tapered shoulder surface 67 to move downwardly and engage the tapered surface 74 on the arm 71. Such engagement causes the arm surface 74 to be pushed downwardly which pivots the arm 71 about the pin 72. When the projecting tip of shoulder surface 67 clears the inner end of the arm surface 74, spring 75 causes arm 71 to swing about the pivot point 72 and slide inwardly, i. e., to the left as viewed in Fig. 5, to the extent permitted by the slot 73. The end surface 74 of the arm 71 then rides above and upon the shoulder 66 as shown in Fig. 5. If the plate 63 is then moved upwardly as viewed in Fig. 6, the shoulder 66 raises the end of the arm 71 and the crayon 77 is moved down into engagement with the surface of the disc 15. Further upward movement of plate 63 causes the shoulder 66 to clear the end of arm 71 and spring 75 causes arm 71 to move back to the position shown in Fig. 4. This movement of arm 71 raises the crayon 77 from the disc 15.

A tripping member 81 is provided to raise the plate 63, from the position shown in Fig. 4, and causes the arm 71 to move the crayon 77 to mark the disc. Member 81 also provides for raising the plate 63 sufficiently to allow the arm 71 to swing back to the position in which the crayon is out of marking contact with the disc 15. This tripping member is in the form of a cam element carried on the outer edge of the grooved tracking disc 38, Figs. 8 and 9. The cam element is positioned adjacent the inner end of the index 20. The cam element 81 is provided with an upwardly inclined surface 82, Fig. 9, which terminates in a raised shoulder portion 83. When the plate 63 is moved to the position shown in Fig. 5, the rotation of disc 38 brings the cam surface 82 into engagement with the underside of the plate. The plate is thus raised and the arm 71 moves to the position shown in Fig. 6 and the crayon 77 places a mark across the index 20. Further rotation of the disc 38 brings the cam shoulder 83 into engagement with the underside of plate 63. The plate is thus raised sufficiently for the shoulder 66 to clear the end of arm 71. The crayon is raised as previously described and the marking mechanism moves to the position shown in Fig. 4. Thus, when the operator desires to indicate on the index 20, for example, the extent or ending point of certain dictation, the button 68 is depressed when the dictation is finished. The marking mechanism is thereby set in the first operating position as shown in Fig. 5. Rotation of the disc 38 then brings the cam element 81 into contact with plate 63 and the marking mechanism is set in the second operating position as shown in Fig. 6. Further rotation of the cam element causes the crayon to be lifted from the disc 15 and the marking mechanism again set in the normal operating position as shown in Fig. 4.

In operation, the transducer 33 is electrically connected through a circuit extending from the head 32 back through the arm 30 and connection 31 to the main receiving circuit contained within the base 10. A microphone is connected to this circuit through a plug in the side of the base, as indicated at 91 in Fig. 1. Electric power is connected to the circuit and to the motor for driving the turntable through the cable 92. A volume control 93 regulates the power flow. The switch 94 provides for controlling the circuit so that oral dictation picked up by the microphone will be either magnetically recorded on the blank 15, or dictation previously recorded will be audibly played back through the microphone. An off and on switch 95 for the main circuit completes the machine controls.

While the form of embodiment of the present invention as herein disclosed constitutes a preferred form, it is to be understood that other forms might be adopted, all coming within the scope of the claim which follows.

I claim:

In a machine for recording or reproducing dictation, in combination with an element upon which the dictation is recorded and having a plurality of indicia appearing on the surface thereof at regularly spaced intervals to form a marking area; a second element responsive to the dictation adapted to engage the surface of the first element; means providing for translatably moving one of the elements relative to the other element; and means for placing a mark in the marking area on the first element to indicate the width of the surface area upon which recording has been effected on the first element comprising a slidably mounted plate carried by the second element, a pivotally mounted marking member adapted to be raised and lowered with respect to the surface of the first element by movement of said plate, and a cam element carried on said element moving means adapted to engage the plate when the latter is moved in one direction to provide for moving the plate in the opposite direction.

ROBERT A. BRATTON.

REFERENCES CITED

The following references are of record in the file of this patent:

UNITED STATES PATENTS

| Number | Name | Date |
|---|---|---|
| 1,688,824 | Miessner | Oct. 23, 1928 |
| 1,949,840 | Languepin | Mar. 6, 1934 |
| 2,258,106 | Bryce | Oct. 7, 1941 |
| 2,261,284 | Proctor | Nov. 4, 1941 |

FOREIGN PATENTS

| Number | Country | Date |
|---|---|---|
| 738,285 | France | Oct. 11, 1932 |
| 614,925 | Germany | May 29, 1935 |
| 614,034 | Great Britain | Dec. 8, 1948 |